May 6, 1952   W. T. OXLEY   2,595,809
ATTACHMENT FOR ANIMAL TRAPS
Filed June 10, 1950
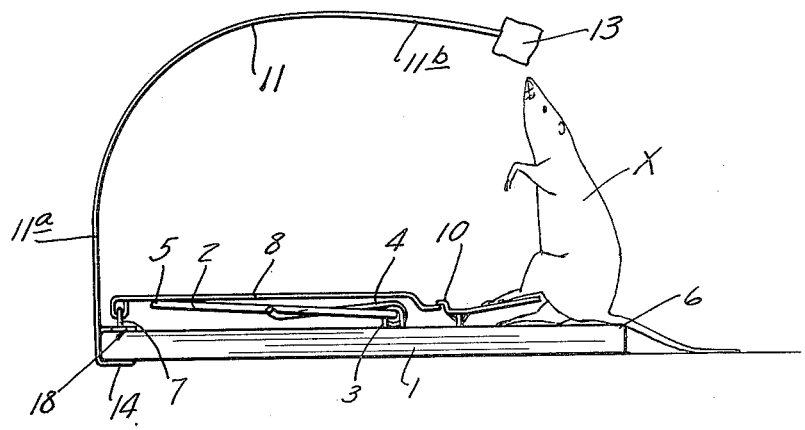
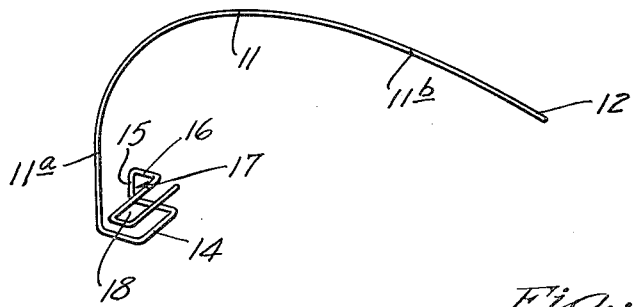
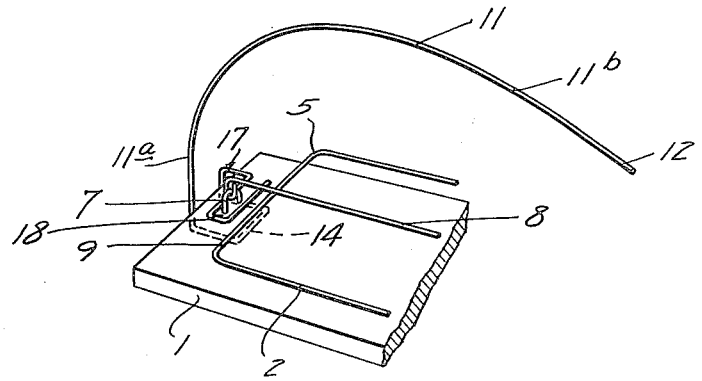
Inventor
Walter T. Oxley
By his Attorneys
Merchant & Merchant Patented May 6, 1952

2,595,809

UNITED STATES PATENT OFFICE 2,595,809

ATTACHMENT FOR ANIMAL TRAPS

Walter T. Oxley, Fergus Falls, Minn.

Application June 10, 1950, Serial No. 167,275

1 Claim. (Cl. 43—77)

My invention relates to rodent traps and, more particularly, to bait hook attachments therefor.

The most common type of mouse trap includes a U-shaped striker jaw horizontally pivotally secured to the intermediate portion of a rectangular baseboard, spring means yieldingly biasing the striker jaw toward an uncocked position in engagement with the baseboard adjacent one end thereof, a trigger bar pivoted at one end to the opposite end of said baseboard and adapted to overlie the striker jaw when the striker jaw is moved to its cocked position in contact with said baseboard adjacent said opposite end thereof, and a trigger located within the area defined by said U-shaped striker jaw when said striker jaw is in its uncocked position. Such traps are inefficient, in view of the fact that too often the mouse or other rodent is either completely within the area defined by the U-shaped striker jaw when in uncocked position, as the trigger releases the same—or sufficiently so to enable the rodent to extricate himself from the striker jaw.

The object of my invention is the provision of simple and inexpensive means for increasing the efficiency of such traps. This I accomplish by securing to the conventional trap a novel bait hook which overlies the trigger in vertically-spaced relation thereto, so as to require the mouse or other rodent to reach the bait only by standing upon the trigger mechanism. Thus, the mouse is in a vertically-disposed position within the arc described by the striker jaw in its path of travel from its cocked to its uncocked position, when the striker jaw is set free.

A still further object of my invention is the provision of a novel means of securing a bait hook of the type described to a conventional mouse or rodent trap.

The above and still further objects of my invention will become apparent from the following detailed specification, appended claims, and attached drawings.

Referring to the drawings, wherein like characters indicate like parts throughout the several views:

Fig. 1 is a side elevation of a conventional mouse trap having my novel attachment secured thereto;

Fig. 2 is a perspective view of my novel bait hook attachment; and

Fig. 3 is a fragmentary view in perspective of a mouse trap with my novel attachment secured thereto.

Referring with greater particularity to the drawings, the numeral 1 indicates the generally rectangular baseboard of a conventional mouse trap. Baseboard 1 is usually formed of wood or other suitable material. A U-shaped striker jaw 2 is horizontally-pivotally secured by means of staples or the like 3 to the intermediate portion of said baseboard 1. A torsion spring 4 yieldingly biases said striker jaw 2 toward an uncocked position with the free end 5 thereof in engagement with the upper surface of the baseboard 1 adjacent one end, the approximate position being indicated by the numeral 6. Adjacent the opposite end of the baseboard 1 is an eye-forming member in the nature of a staple 7. Pivotally secured at one of its ends is a trigger bar 8, which is adapted to overlie the transverse portion 9 of the striker jaw 2 when said striker jaw is moved against bias of spring 4 to its cocked position, as indicated in Figs. 1 and 3. A trigger 10 is secured to the upper surface of the baseboard 1 within the area defined by the U-shaped striker jaw 2 when said jaw is in its uncocked position. As shown in Fig. 1, said trigger 10 is adapted to releasably engage the free end of the trigger bar 8.

So far, I have described a conventional mouse or rodent trap. My novel attachment for traps of the above-described type comprises a bait hook 11, shown as including a vertically-disposed portion 11a and an arcuate portion 11b which terminates in a free end 12, which is adapted to receive suitable bait 13. As shown, the end 12 overlies the trigger 10 in vertically-spaced relation thereto. The bait hook 11 is formed from a single length of wire and is bent at its lower end to provide a generally horizontally disposed U-shaped foot 14 adapted to underlie the baseboard 1, preferably and as shown, immediately below the eye-forming staple 7. After defining the U-shaped foot 14, the wire is again bent forwardly, as at 16, to provide, in conjunction with elements 14 and 15, a forwardly-opening friction clip 17 which is adapted to receive the baseboard 1, as shown in Figs. 1 and 3. As there shown, the U-shaped foot 14 engages the under surface of the base board 1, the portions 11a and 15 engage the side edge of the baseboard 1, and the portion 16 frictionally engages the upper surface thereof.

As shown, the extreme lower end of the wire from which the hook element 11 is formed is bent backwardly upon itself immediately adjacent the portion 16 to form a laterally-opening recess 18 adapted to receive therein the eye-forming staple 7, whereby to positively limit movement of said bait hook 11 in three directions. It will further be noted that the free end 12 of the hook 11 immediately overlies the trigger 10 when the staple element 7 is received within the recess 18.

With my novel structure, it will be seen that a mouse or the like, identified by the numeral X in Fig. 1, must of necessity be in an upstanding position while standing on the trigger 10, in order to reach the bait 13. Thus, a portion of the body of the mouse is of necessity within the arc described by the striker jaw 2 in its movement from the cocked position of Fig. 1 to its uncocked position, wherein the transverse member 9 is in engagement with the opposite end of the baseboard 1, as at 6.

I have thoroughly tested my novel structure and have found the same to be highly satisfactory and efficient for accomplishment of the above objects; and, while I have shown a preferred embodiment of my novel structure, it is to be understood that the same is capable of modification without departure from the spirit and scope of the appended claim.

What I claim is:

An attachment for animal traps of the type comprising a baseboard, a U-shaped striker jaw horizontally pivoted at one end to the intermediate portion of said baseboard, spring means yieldingly biasing the striker jaw toward an uncocked position in engagement with said baseboard adjacent one end thereof, an eye-forming member adjacent the opposite end of said baseboard, a trigger bar pivoted at one end to the eye-forming member and adapted to overlie the striker jaw when the striker jaw is moved to its cocked position against the bias of said spring means, and a trigger located in the area defined by the striker jaw when said trigger is in its uncocked position, said trigger adapted to releasably engage the free end of said trigger bar, said attachment comprising a bait hook having its upper end adapted to overlie the trigger, said bait hook being formed from a single length of wire and being formed at its lower end to provide a horizontally-disposed U-shaped supporting foot adapted to underlie said baseboard, and a vertically-disposed U-shaped clamping element the upper portion of which is adapted to frictionally engage the upper surface of said baseboard immediately above said foot, the extreme lower end of said bait hook being bent backwardly upon itself to provide a laterally-opening recess adapted to receive therein said eye-forming member whereby to positively limit movements of said bait hook in three directions.

WALTER T. OXLEY.

REFERENCES CITED

The following references are of record in the file of this patent:

UNITED STATES PATENTS

| Number | Name | Date |
|---|---|---|
| 578,652 | Morrison | Mar. 9, 1897 |
| 1,466,178 | Lange | Aug. 28, 1923 |
| 1,573,185 | Ney | Feb. 16, 1926 |
| 1,621,720 | Harper | Mar. 22, 1927 |
| 1,974,289 | Nord | Sept. 18, 1934 |
| 2,388,539 | Hartman | Nov. 6, 1945 |

OTHER REFERENCES

Popular Science, p. 242, March 1949.